(12) United States Patent
Weber et al.

(10) Patent No.: US 6,785,753 B2
(45) Date of Patent: Aug. 31, 2004

(54) METHOD AND APPARATUS FOR RESPONSE MODES IN PIPELINED ENVIRONMENT

(75) Inventors: Wolf-Dietrich Weber, San Jose, CA (US); Jay S. Tomlinson, San Jose, CA (US); Drew E. Wingard, San Carlos, CA (US)

(73) Assignee: Sonics, Inc., Mountain View, CA (US)

( * ) Notice: Subject to any disclaimer, the term of this patent is extended or adjusted under 35 U.S.C. 154(b) by 505 days.

(21) Appl. No.: 09/872,126

(22) Filed: Jun. 1, 2001

(65) Prior Publication Data

US 2002/0184421 A1 Dec. 5, 2002

(51) Int. Cl.[7] ............................................. G06F 13/42
(52) U.S. Cl. ...................................... 710/105; 710/107
(58) Field of Search ............................... 710/1, 26, 29, 710/104, 105, 107, 110, 267, 268, 266, 305

(56) References Cited

U.S. PATENT DOCUMENTS 5,068,823 A   11/1991  Robinson
5,475,860 A * 12/1995  Ellison et al. ................. 710/26
5,553,245 A *  9/1996  Su et al. ...................... 710/104
5,948,089 A    9/1999  Wingard et al.
6,182,183 B1   1/2001  Wingard et al.

OTHER PUBLICATIONS

Search Report for PCT/US02/05299, mailed Jun. 12, 2002, 1 page.

Sonics Press Release, SiliconBackplane MicroNetworks Now Exceed 250 MHz, End–to–end, Sonics and Denali Attack Shared Memory Bottlenecks in SOC Designs, wysiwyg://19/http://www.sonicsinc.com/so... sreleases/data.pr_2000_05_29/view PR. html, May 28, 2002, 3 pages.

* cited by examiner

Primary Examiner—Khanh Dang
(74) Attorney, Agent, or Firm—Blakely, Sokoloff, Taylor & Zafman LLP

(57) ABSTRACT

A pipelined network is disclosed which provides for at least one mode to control the state of a response flag and when the target device is unable to respond to an initiator device request.

22 Claims, 6 Drawing Sheets

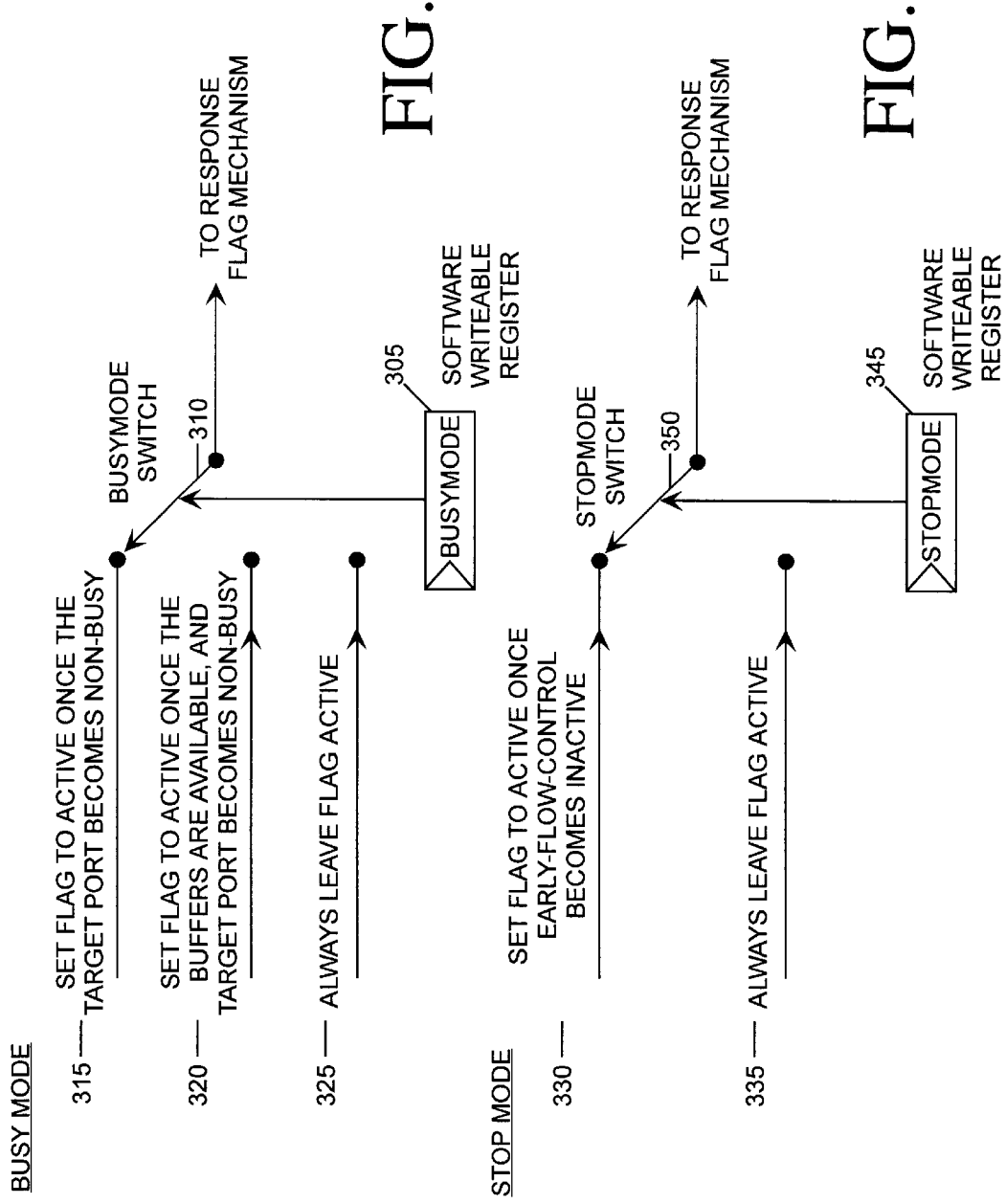

US 6,785,753 B2

METHOD AND APPARATUS FOR RESPONSE MODES IN PIPELINED ENVIRONMENT

FIELD OF THE INVENTION

The present invention relates to a pipelined system and method of operation of the same. More particularly, the present invention relates to application of different response modes in a pipelined system environment.

BACKGROUND

In a pipelined system, such as that illustrated in FIG. 1A, one or more initiator devices 5,10,15 communicate requests across the bus 30 to target devices 20,25. The target device 20, 25 receiving a request issues a response across the bus 30 to the initiator 5, 10, 15 of the request. The pipeline bus has a fixed length pipeline protocol for transferring requests from initiators to targets. The pipeline has a fixed slot into which the response must be placed by the target. This is illustrated by FIG. 1B which illustrates a pipeline protocol having a depth of three clock cycles. Thus, a request 40, 45, 50, 55 driven by an initiator has a latency of three clock cycles before a response 60, 65, 70, 75 is issued by the target device. These fixed slots for response must be utilized by the target.

If the target is slow and does not have the response available in time, the protocol allows for a special "no-response-available" (NRA) response to be given to the initiator device which effectively lets the initiator know that a request cannot be completed within a single pipeline depth but must instead be reattempted at a later time. There are multiple options for deciding when to reattempt the request. The simplest is for the initiator to reattempt the request as soon as it has received the NRA response. This is illustrated in FIG. 1C. However, if the target is still unable to supply a response it is possible that even the retried request receives another NRA response. In this case, the pipeline slot has been wasted as no useful progress has been made. Instead, it may be better for the initiator to hold off on its reattempt until it receives a notification from the target. The target does not send the notification until it is confident that it can service the request and supply a response in time.

There are many different choices on how the target can notify the initiator that it is available to service the request. In an on-chip environment where additional wires may be added with little cost, one cost-effective mechanism is to assign a dedicated wire for the notification from each target to all initiators. For purposes of discussion herein, this notification wire is referred to as a "response flag" which operates between the target and the initiator. When the target issues an NRA response, it also sets the response flag to inactive. While the response flag is inactive, the initiator does not retry any pending request it has for the corresponding target. When the response flag goes active, the initiator knows to reattempt any requests that have received NRA responses and are waiting for that target. It is possible that a target may even have different independent ports for accepting requests from initiators, and each of these ports could have its own dedicated response flag. FIGS. 1D and 1E show the timing and exemplary system using a response flag.

SUMMARY OF THE INVENTION

The present invention provides for different modes of operation to enhance the usefulness of the response flag. In one embodiment, a first mode sets the response flag to a first state if the space available in the target device is available to service the request issued by the initiator. A second mode is provided wherein the response flag is set to the first state if space is available in the target device and the target device port is not busy. A third mode is provided in which the response flag is always set to the first state such that the initiator functions is a manner of the prior art of reissuing the request upon receipt of the NRA response. A fourth mode is provided in which the response flag is set to the first state if an early flow control condition exists. The mode or modes can be selected statically at time of system manufacture, or subsequently during configuration of the system, as well as dynamically as the system application or environment dictates.

BRIEF DESCRIPTION OF THE DRAWINGS

The object features and advantages of the present invention will be apparent to one skilled in the art from the following detailed description in which

FIG. 3 illustrates one embodiment which illustrates the selection of response flag states based on the busy mode selected.

FIG. 4 illustrates one embodiment which illustrates the selection of response flag states based upon the stop mode selected.

DETAILED DESCRIPTION

Figure 1A:
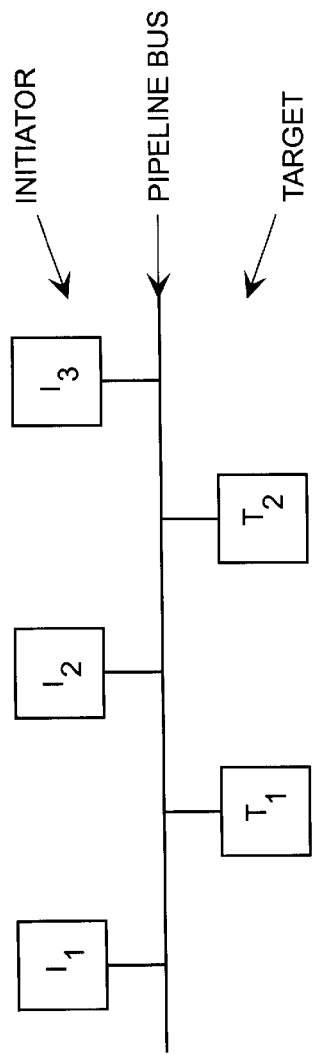
FIGS. 1A, 1B, 1C, 1D and 1E are prior art representations illustrating the use of the no response available (NRA) response and response flag in a pipelined network environment.
Figure 1B:
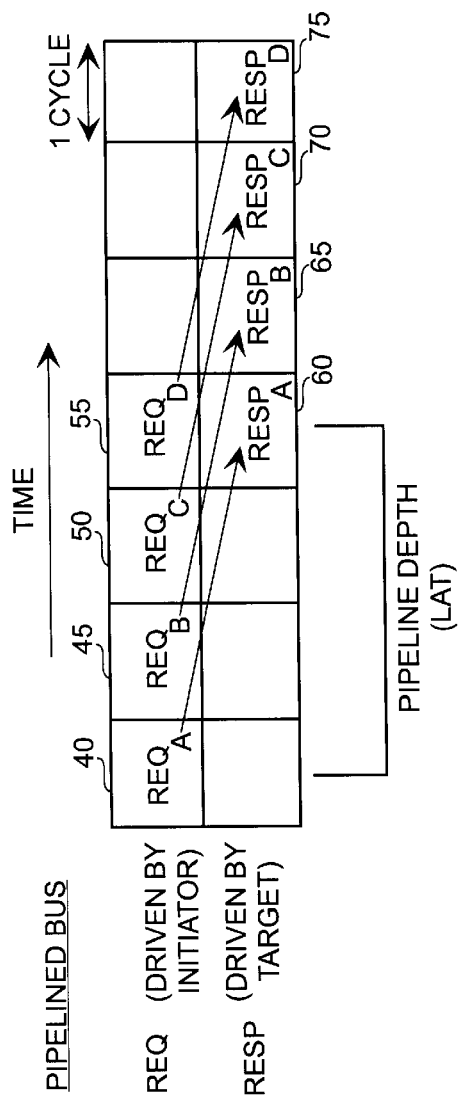
Figure 1C:
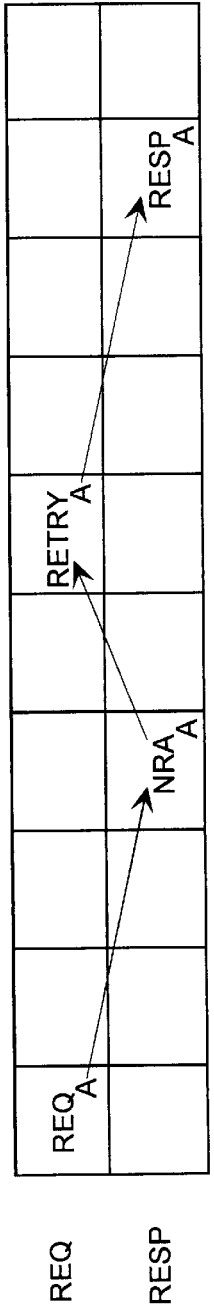
Figure 1D:
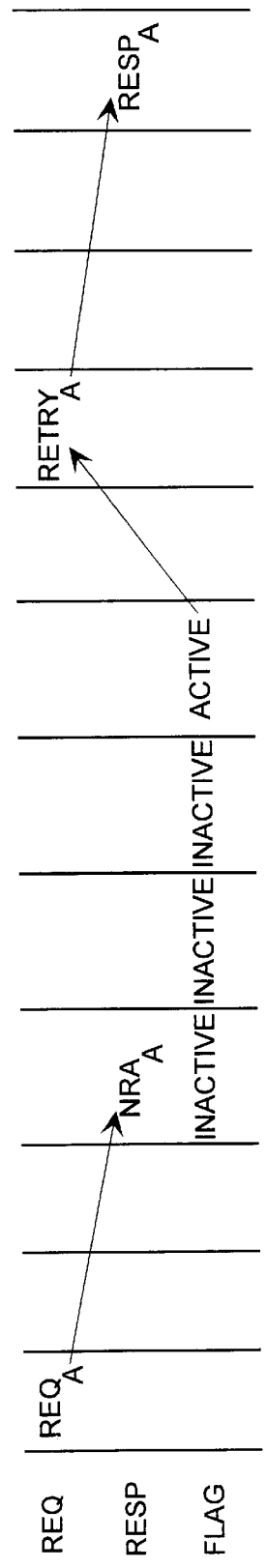
Figure 1E:
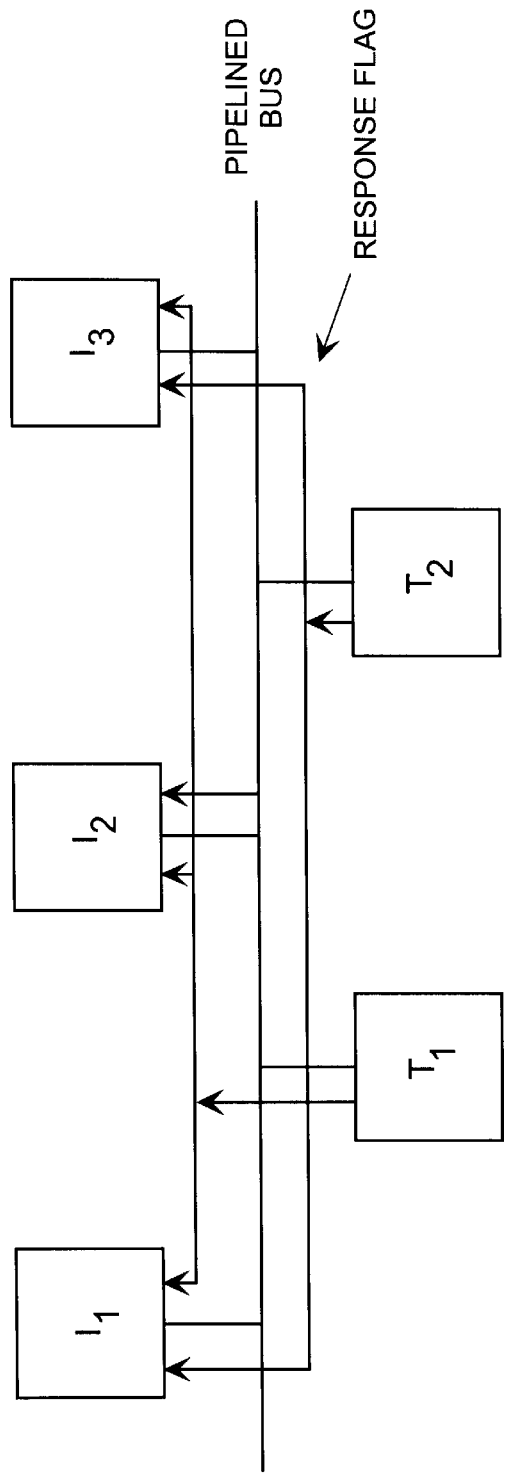
Figure 2:
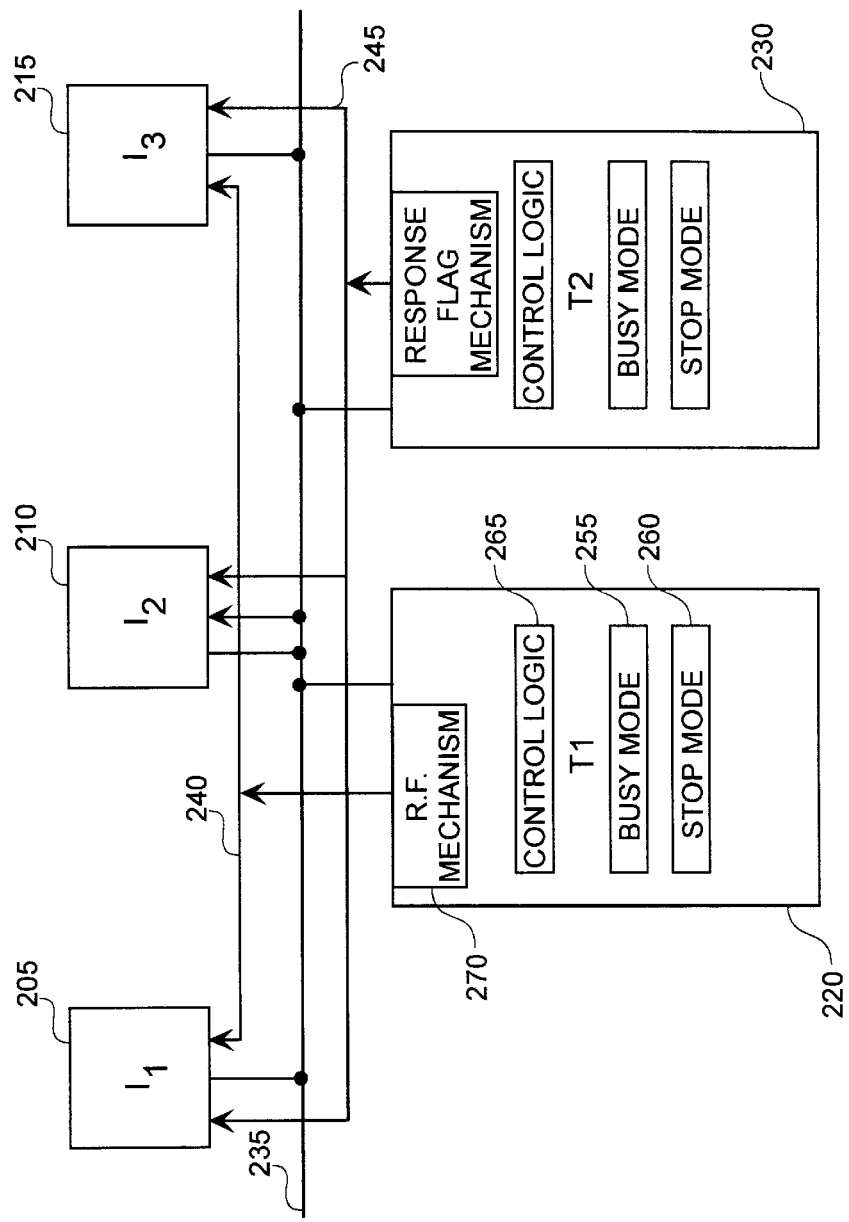
FIG. 2 is a simplified block diagram of one embodiment of the system of the present invention.

The system and method of the present invention provides different modes for determining the state of the response flag utilized in a No Response Available (NRA) response when a target device is unavailable to respond to an initiator request. This may be used in a pipelined network environment as illustrated by the simplified block diagram of FIG. 2. FIG. 2 shows initiator functional blocks 205, 210, 215 and target functional blocks 220, 230. The functional blocks 205, 210, 215, 220, 230 may be a variety of logic or computational systems including a computer system, a signal processing system or a logic device. For purposes of discussion herein, initiator blocks 205, 210, 215 issue requests on the network 235 to a target device 220, 230. The target device receives the request and issues a response across the network 235 to the initiator device which issued the request. When the target device 220, 230 is unavailable to respond to the initiator's request, a no-response-available (NRA) response is sent over the network 235 to the initiator device. This includes information identifying which response flag the initiator should watch. The response flag is set or reset depending upon certain conditions at the target device 220, 230.

As shown in the embodiment of FIG. 2, each target device 220, 230 employs a dedicated wire from each target 220, 230 to all of the initiator blocks 205, 210, 215. Thus, for example, target 220 communicates the state of the response flag to blocks 205, 210, 215 via connection 240. Block 230 communicates via connection 245. Using the NRA response and observing the state of the response flag, the initiators 205, 210, 214 are better able to determine when to reattempt transmission of the request. A variation of this mechanism is to share one or more response flags between multiple targets.

In the embodiment shown in FIG. 2, each target device includes different modes that are selectable. The modes indicate the conditions in which the response flag would be set to an active state, or reset to an inactive state. In one embodiment, the modes are selectable by a status register, for example, registers 255, 260 which will be discussed further below. In one embodiment, the values stored in these registers are used by control logic 265 to determine the operation of the response flag utilized by the response flag mechanism to set the state on conductor 245 or 240. The registers may be permanently set at time of configuration of the network, at time of construction of the network or may be dynamically updated or reprogrammed at runtime. In alternate implementations, these registers may be embodied in hardwired logic, or memory locations in a general purpose system memory. In one embodiment, the registers are software programmable.

FIGS. 3 and 4 illustrate operations of the different modes which may be implemented in accordance with the teachings of the present invention. In the embodiment shown in FIG. 3, the busy mode register 305 is a software writeable register. For example, the system the target is part of may be configured to update the busy mode register when desirable to change the state of the busy mode switch 310. The busy mode switch may be a hardware or software switch that functions to enable the logic to be used to determine the response flag.

One reason for a target to be unable to supply a response in time is that it does not have any resources to buffer the incoming request and service it. The issue may be that there are no buffers available, or that the port of the target device targeted by the request may be currently utilized or occupied by another initiator that is in the middle of a burst of transfers which cannot be interrupted. In this latter case, buffers may be available, but they cannot be used by initiators other than the one that is in the middle of a burst of transfers.

Control over the behavior of a response flag in the case of an out-of-resource condition is determined by a mode control referred to herein as "busy mode". This mode control may be fixed when the system is configured, or may be something that is left for system software to program at run time. In one embodiment some busy mode options include: always leave the flag active, set the flag to active once the target port becomes non-busy with a burst from a different initiator and buffers are available, set the flag to active once the target becomes non-busy with a burst from a different initiator but leave it active for requests from the same initiator. The last option is useful because it causes the initiator that is within the burst to busy wait with requests, whereas other initiators are forced to wait for the flag to go active, thus giving the initiator that is within the burst a better chance to complete the burst.

Thus the busy mode switch 310 may be set to use the no-response-available response and set the response flag to active when the target port becomes non-busy 315. An alternate criterion is to set the flag active if the buffers are available and the target port is not busy 320. Alternately, the flag is not used 325 and therefore would always be set to active regardless of the state of the buffers or the state of the target port.

In an alternate embodiment, a different use of the response flag mechanism is used to communicate flow control information from a different target that is downstream of the immediate target connected to the request pipeline. In this embodiment, it may be advantageous to apply flow control in advance of actually running out of resources so as to preserve the resources for other requests that may be higher priority or that may have a better chance of receiving service from the downstream target. This is referred to, for purposes of discussion herein, as an early flow control condition. Control over the behavior of a response flag in the case of an early flow control condition is determined by a mode control referred to herein as "stop mode". This mode control could be fixed in the implementation of the system, or could be something that is left for system software to program at run time. In one embodiment, some stop mode options include: always leave the response flag active, set the flag to active whenever early flow control is not being applied from a downstream target.

Thus, referring to FIG. 4, a NRA response is issued and the response flag is set to an active state if early flow control is inactive 330. In an alternate mode, the NRA response is utilized but the flag is not; therefore the flag is always set to an active state 335. The busy mode and stop mode conditions and logic described herein may be used together or separately. In addition, it is contemplated that other modes may be implemented in a similar manner to address other conditions that lead to an NRA response on the request pipeline.

In one embodiment a separate response flag wire may be used for each different condition that leads to an NRA response on the request pipeline. In other embodiments, chip area constraints or other conditions may require that several conditions share a single wire. In such embodiments, it is possible that several different requests are waiting on different conditions sharing the same response flag; therefore each event of a condition becoming active should be reflected on the combined response flag. Otherwise a condition might be missed and a request could wait forever.

Figure 5:
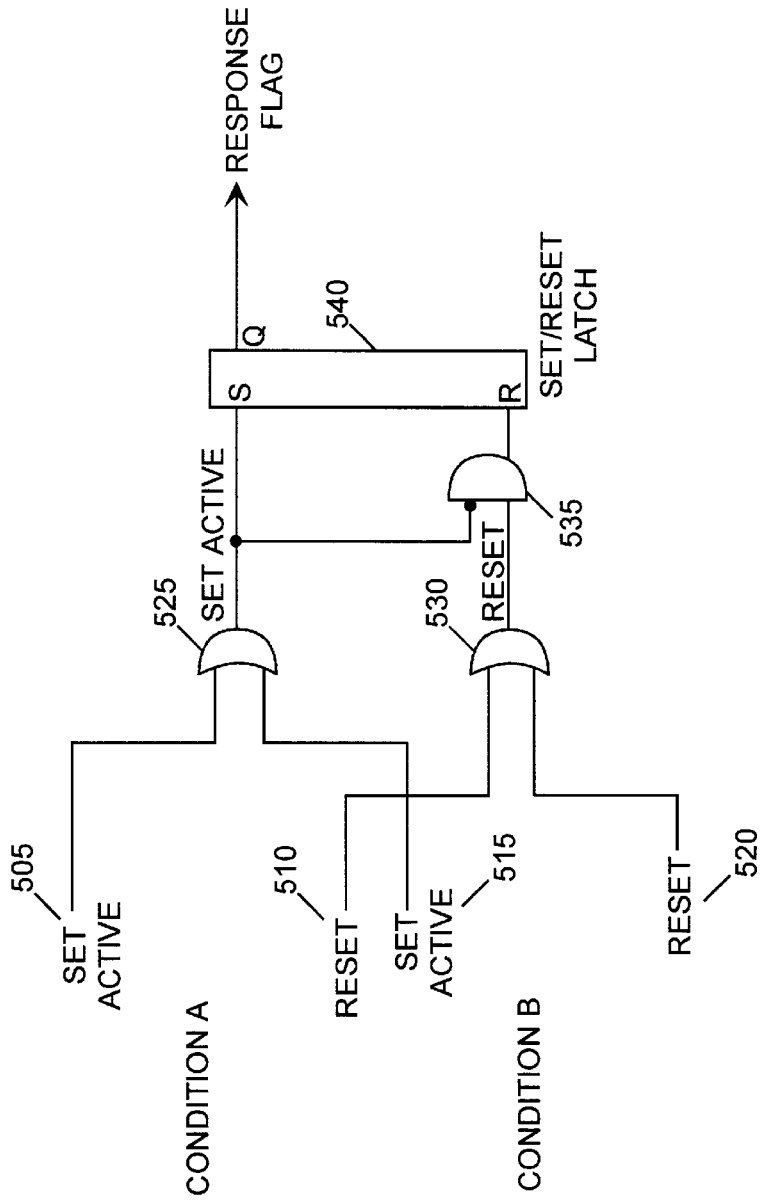
FIG. 5 illustrates one embodiment of logic to combine conditions to generate a multiple input state response flag.

In one embodiment, illustrated by FIG. 5, several conditions may be combined as follows. For each condition, the set 505, 515 (i.e., going active) and reset 510, 520 (i.e., going inactive) conditions are detected separately. All the set and reset events are individually combined using OR-gates, 525, 530. The resulting combined set and reset events are passed through an AND-gate 535 so as to mask off the reset event while the set event is active. The set and reset are then fed into a set/reset latch 540 to produce the response flag such that a logic 1 corresponds to an active response flag.

The invention has been described in conjunction with at least one embodiment. It is evident that numerous alternatives, modifications, variations and uses will be apparent to those skilled in the art in light of the foregoing description.

What is claimed is:

1. A pipelined network, comprising:
   at least one initiator device configured to issue requests;
   a target device configured to receive requests; and
   bus signal lines comprising lines to issue requests and responses to requests between initiator devices and the target device and a response flag coupled between the target device and at least one of the initiator devices;
   the target device having logic to respond to the request in different modes of operation comprising
      a first mode wherein a no-response-available (NRA) response is selectively issued and a response flag is set to a first state if space is available in the target device to service the request;

a second mode wherein an NRA response is selectively issued and the response flag is set to the first state if space is available in the target device to service the request and a port of the target device is not busy;

a third mode wherein an NRA response is selectively issued and the response flag is set to the first state; and control logic to direct the logic which mode of operation to utilize when issuing the NRA response and setting the state of the response flag to a first initiator device when the target device is unavailable to service the request of the first initiator device.

2. The pipelined network as set forth in claim 1, wherein the control logic is selected from the group consisting of static control, program controlled, software controlled and hardwired controlled.

3. The pipeline as set forth in claim 1, wherein the logic comprises response logic configured to issue a NRA response and a response flag logic configured to selectively place the response flag in the first state or the second state.

4. The pipeline as set forth in claim 3, wherein the logic further comprises a fourth mode wherein the NRA response is selectively issued and the response flag is set to the first state when an early-flow-control indication occurs.

5. The pipeline as set forth in claim 4, wherein the control logic selects one of the first, second, third, and fourth modes and logically combines the states of the response flag corresponding to the selected mode to generate a response flag received by the at least one initiator device.

6. A pipelined network, comprising:
at least one initiator device configured to issue requests;
a target device configured to receive requests; and
bus signal lines comprising lines to issue requests and responses to requests between initiator devices and the target device and a response flag coupled between the target device and at least one of the initiator devices;
the target device having logic to respond to the request in different modes of operation comprising
a first mode wherein a NRA response is selectively issued and a response flag is set to a first state if an early-flow-control indication is in an inactive state;
a second mode wherein an NRA response is selectively issued and the response flag is set to the first state; and
control logic to direct the logic which mode of operation to utilize when issuing the NRA response and setting the state of the response flag to a first initiator device when the target device is unavailable to service the request of the first initiator device.

7. The pipelined network as set forth in claim 6, wherein the control logic is selected from the group consisting of static control, program controlled, software controlled and hardwired controlled.

8. The pipeline as set forth in claim 6, wherein the logic comprises response logic configured to issue the NRA response and a response flag logic configured to selectively place the response flag in the first state or the second state.

9. A pipelined network comprising:
at least one initiator device configured to issue requests;
a target device configured to receive requests; and
bus signal lines comprising lines to issue requests and responses to requests between initiator devices and the target device and a response flag coupled between the target device and at least one of the initiator devices;
the target device having logic to respond to the request in different modes of operation comprising a first mode wherein a NRA response is selectively issued and a response flag is set to a first state if a first condition exists;

a second mode wherein an NRA response is selectively issued and the response flag is set to the first state if a second condition exists; and control logic to direct the logic which mode of operation to utilize when issuing the NRA response and setting the state of the response flag to a first initiator device when the target device is unavailable to service the request of the first initiator device.

10. The pipeline as set forth in claim 9, wherein the control logic logically combines the states of the response flag corresponding to the first and second modes to generate a response flag to be received by the at least one initiator device.

11. The pipeline as set forth in claim 9, wherein the first condition comprises space availability in the target device to service the request and whether the target device is busy.

12. The pipeline as set forth in claim 9, wherein the second condition comprises a state of an early-flow-control.

13. In a pipelined network comprising at least one initiator device configured to issue requests and at least one target device coupled to receive requests from at least one initiator device, a method for notifying initiator devices that a target device is unavailable to service an initiator device request, the method comprising:
directing the target to operate in a first mode of operation or in a second mode of operation; wherein if the target operates in the first mode, then
selectively issuing a NRA response and setting a response flag to a first state if space is available in the target device to service the request and the target device is busy;
selectively issuing an NRA response and setting the response flag to the first state if space is available in the target device to service the request and a port of the target device is not busy; wherein if the target operates in the second mode, then
selecting a response to issue to an initiator device when a target device is unavailable to service the initiator device request.

14. The method as set forth in claim 13, wherein selecting is performed at a time selected from the group consisting of at run-time and at network configuration.

15. The method as set forth in claim 13, further comprising selectively issuing an NRA response and setting the response flag to the first state if an early-flow-control indication is in a first state and the target operates in either the first or the second mode.

16. The method as set forth in claim 15, further comprising logically combining response flag states of selected responses and to generate a response flag received by the at least one initiator device.

17. In a pipelined network comprising at least one initiator device configured to issue requests and at least one target device coupled to receive requests from at least one initiator device, a method for notifying initiator devices that a target device is unavailable to service an initiator device request, the method comprising:
directing the target to operate in a first mode of operation or in a second mode of operation; wherein if the target operates in the first mode, then
selectively issuing a NRA response and setting the response flag to the first state if an early-flow-control indication is in a first state;
selectively issuing the NRA response and setting the response flag to the first state; and selecting a response to issue to an initiator device when a target device is unavailable to service the initiator device request.

18. The method as set forth in claim 17, wherein selecting is performed at a time selected from the group consisting of at run-time and at network configuration.

19. In a pipelined network comprising at least one initiator device configured to issue requests and at least one target device coupled to receive requests from at least one initiator device, a method for notifying initiator devices that a target device is unavailable to service an initiator device request, the method comprising:

directing the target to operate in a first mode of operation or in a second mode of operation; wherein if the target operates in the first mode, then selectively issuing a NRA response and setting a response flag to a first state if a first condition exists;

selectively issuing the NRA response and setting the response flag to the first state if a second condition exists; and selecting a response to issue to an initiator device when the target device is unavailable to service the initiator device request.

20. The method as set forth in claim 18, further comprising logically combining the states of the response flag corresponding to the first and second conditions to generate a response flag to be received by the at least one initiator device.

21. The method as set forth in claim 18, wherein the first condition comprises space availability in the target device to service the request and whether the target device is busy.

22. The method as set forth in claim 18, wherein the second condition comprises a state of an early-flow-control.

* * * * *